(12) United States Patent
Huang et al.

(10) Patent No.: US 9,671,770 B2
(45) Date of Patent: Jun. 6, 2017

(54) CIRCUIT STRUCTURE OF GAS VALVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Kuan-Chou Lin, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 314 days.

(21) Appl. No.: 14/674,741

(22) Filed: Mar. 31, 2015

(65) Prior Publication Data

US 2016/0291604 A1     Oct. 6, 2016

(51) Int. Cl.
  *G05B 15/02*  (2006.01)
  *G05D 7/06*  (2006.01)
  *F24H 9/20*  (2006.01)

(52) U.S. Cl.
  CPC ............. *G05B 15/02* (2013.01); *F24H 9/20* (2013.01)

(58) Field of Classification Search
  CPC .................. F24H 9/20; G05B 15/02
  See application file for complete search history.

(56) References Cited

U.S. PATENT DOCUMENTS

| | | | |
|---|---|---|---|
| 7,073,524 B2* | 7/2006 | Chian | F16K 31/0675 137/1 |
| 7,112,059 B2* | 9/2006 | Donnelly | F23N 5/245 122/504 |
| 8,272,376 B2* | 9/2012 | Ma | F23N 5/102 126/39 BA |
| 8,439,065 B2* | 5/2013 | Dirkin | F15B 21/044 137/197 |
| 8,887,758 B2* | 11/2014 | Kamada | F16K 31/0675 137/554 |
| 2005/0145282 A1* | 7/2005 | Chian | F16K 31/0675 137/613 |
| 2010/0288262 A1* | 11/2010 | Ma | F23N 5/102 126/39 BA |
| 2012/0292543 A1* | 11/2012 | Kamada | F16K 31/0675 251/129.15 |

* cited by examiner

*Primary Examiner* — Abdelmoniem Elamin
(74) *Attorney, Agent, or Firm* — Ming Chow; Sinorica, LLC

(57) ABSTRACT

A circuit structure of a gas valve controls a first driver and a second driver, which respectively drive a main valve and a safety valve. The circuit structure includes a power switching circuit, a control circuit, a protection circuit, an abnormal voltage detection circuit, a first valve switching circuit, a second valve switching circuit, and a processor which is electrically connected to the aforementioned circuits. The processor receives abnormal signals outputted by the abnormal voltage detection circuit, and outputs signals to control the power switching circuit, the control circuit, the protection circuit, the first valve switching circuit, and the second valve switching circuit to control the first driver and the second driver. The main valve and the safety valve can be opened or closed in this way.

10 Claims, 2 Drawing Sheets

CIRCUIT STRUCTURE OF GAS VALVE

BACKGROUND OF THE INVENTION

1. Technical Field

The present invention relates generally to a gas appliance, and more particularly to a circuit structure of a gas valve.

2. Description of Related Art

Gas appliances (i.e., gas stoves, water heaters, fireplaces) are commonly seen in homes nowadays, which make modern people's life more convenient and comfortable. However, without proper design of protection, gas appliances can be hazardous. To better ensure the safety of using such appliances, gas valves are usually designed to include a main valve and a safety valve, wherein the main valve regulates gas flows, and the safety valve decides whether to supply gas or not.

In addition, a gas appliance usually uses a driver to drive the main valve and the safety valve to precisely control the operation. In all aspects, how to effectively ensure the safety and reduce the cost of manufacturing at the same time has become a main topic for manufacturers.

BRIEF SUMMARY OF THE INVENTION

In view of the above, the primary objective of the present invention is to provide a circuit structure of a gas valve, which effectively ensures the safety with multi-protection. Furthermore, the construction of the circuit structure is simple, which reduces the cost of manufacturing.

The circuit structure of a gas valve provided in the present invention is connected to a power source, and controls a first driver and a second driver which respectively drive a main valve and a safety valve. The circuit structure includes a power switching circuit, a control circuit, a protection circuit, an abnormal voltage detection circuit, a first valve switching circuit, a second valve switching circuit, and a processor. The power switching circuit is connected to the power source, wherein the power switching circuit transmits or cuts off power provided by the power source to flow therethrough. The control circuit is electrically connected to the power switching circuit, the first driver, and the second driver, wherein the control circuit receives the power provided by the power source, and outputs power having either a first voltage or a second voltage to control the first driver and the second driver, wherein the first voltage is not equal to the second voltage. The protection circuit is electrically connected to the control circuit to transmit or cut off the power outputted from the control circuit. The abnormal voltage detection circuit is electrically connected to the control circuit, the first driver, and the second driver to detect if the voltage provided to the first driver from the control circuit is higher than a first abnormal voltage, and to detect if the voltage provided to the second driver is higher than a second abnormal voltage, wherein when the voltage provided to the first driver is higher than the first abnormal voltage, the abnormal voltage detection circuit outputs a first abnormal signal; when the voltage provided to the second driver is higher than the second abnormal voltage, the abnormal voltage detection circuit outputs a second abnormal signal. The first valve switching circuit is connected to the first driver to turn on or off the first driver. The second valve switching circuit is connected to the second driver to turn on or off the second driver. The processor is electrically connected to the power switching circuit, the control circuit, the protection circuit, the abnormal voltage detection circuit, the first valve switching circuit, and the second valve switching circuit, wherein the processor receives the first and the second abnormal signals outputted by the abnormal voltage detection circuit, and correspondingly outputs signals to control the power switching circuit, the control circuit, the protection circuit, the first valve switching circuit, and the second valve switching circuit.

Whereby, with the multi-protection design mentioned above, the safety of users can be ensured, and the cost of manufacturing can be reduced, too.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
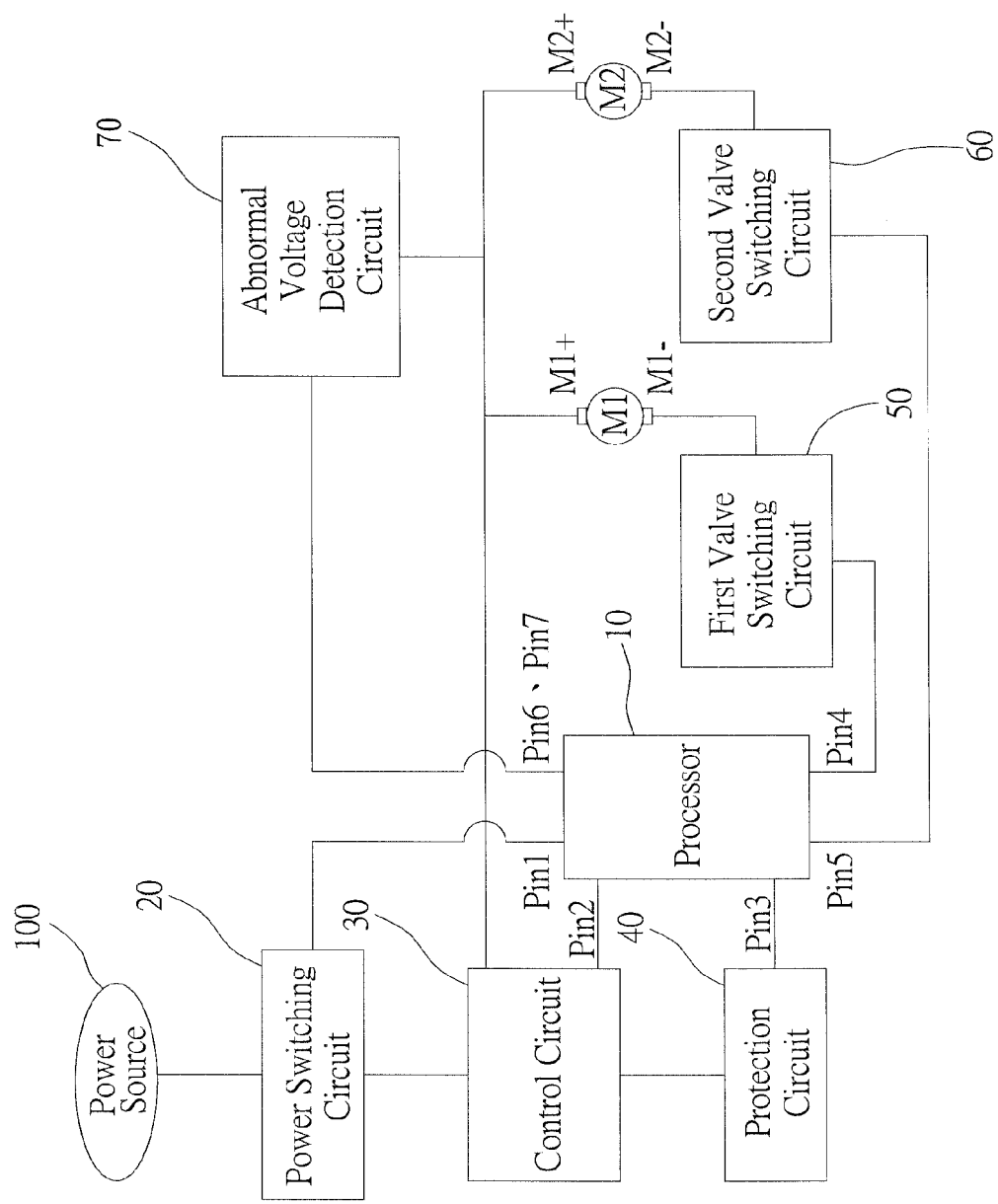
FIG. 1 is a perspective view of a preferred embodiment of the present invention.
Figure 2:
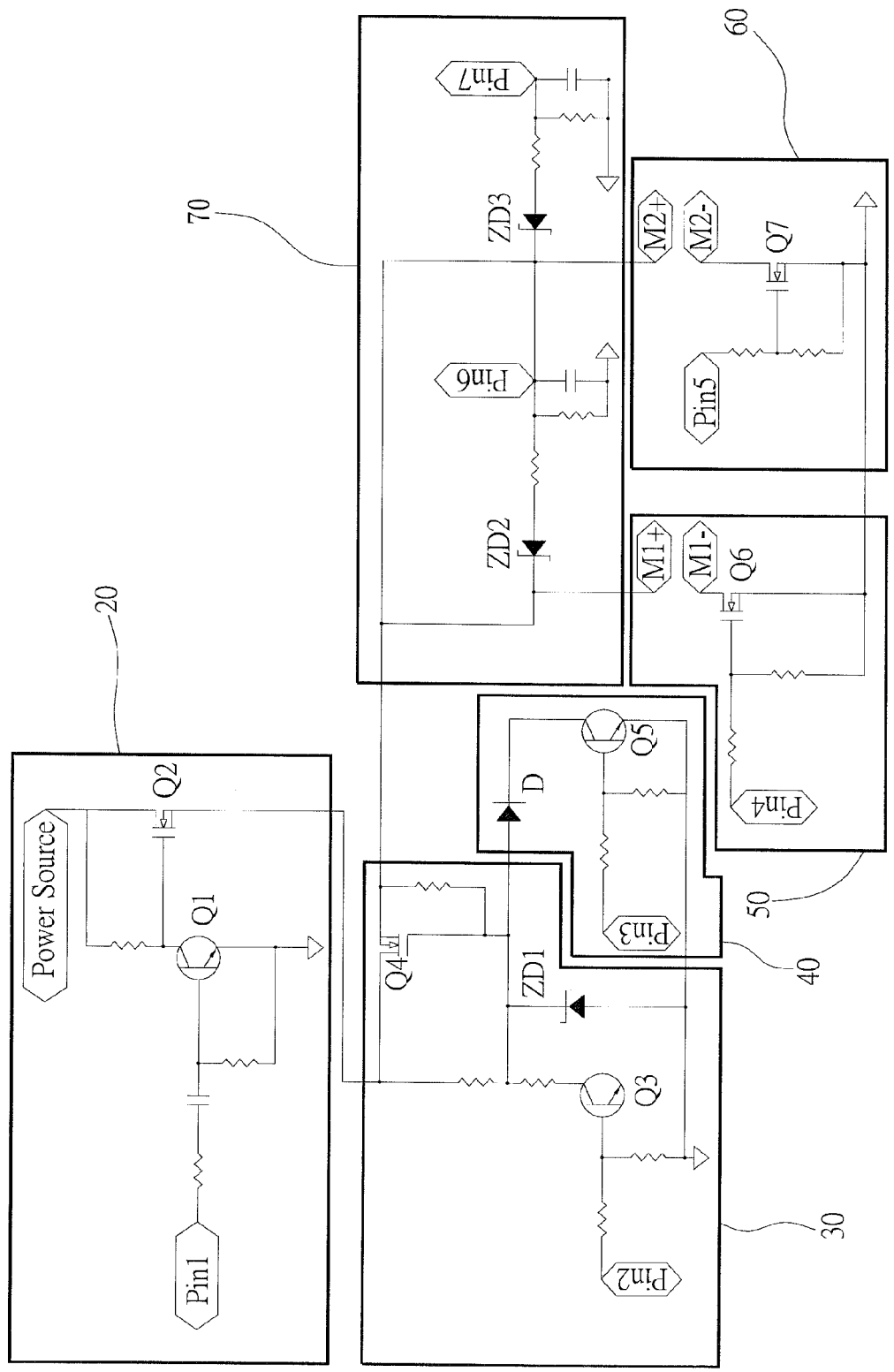
FIG. 2 is a detailed circuit of the preferred embodiment of the present invention.

As shown in FIG. 1 and FIG. 2, a circuit structure of a gas valve provided in the present invention is connected to a power source 100, and controls a first driver M1 and a second driver M2, which respectively drive a main valve (not shown) and a safety valve (not shown). In the preferred embodiment, the drivers M1, M2 are both stepping motors. The method of adjusting and controlling the open positions of the main valve and the safety valve is conventional, and therefore is not described in detail herein. Of course, in addition to stepping motors, solenoid valves or other devices capable of driving the main valve and the safety valve are also feasible.

The circuit structure of the preferred embodiment of the present invention includes a processor 10, a power switching circuit 20, a control circuit 30, a protection circuit 40, a first valve switching circuit 50, a second valve switching circuit 60, and an abnormal voltage detection circuit 70.

The processor 10 has a plurality of pins Pin1-Pin7, wherein the pins Pin1-Pin5 optionally outputs signals having either high or low level voltage, while the pins Pin6-Pin7 are used to receive signals.

The power switching circuit 20 and the power source 100 are connected to the pin Pin1 of the processor 10, wherein the processor 10 controls the power switching circuit 20 to transmit or cut off the power provided by the power source 100. In the preferred embodiment, the power switching circuit 20 mainly includes a bipolar junction transistor (BJT) Q1, and a metal-oxide-semiconductor field-effect transistor (MOSFET) Q2, wherein the base of the BJT Q1 is electrically connected to the pin Pin1 of the processor 10, while the gate of the MOSFET Q2 is electrically connected to the collector of the BJT Q1, and the drain thereof is electrically connected to the power source 100.

Whereby, when the pin Pin1 of the processor 10 outputs a signal having low level voltage to the BJT Q1, the drain and the source of the MOSFET Q2 are connected, and therefore the power provided by the power source 100 is allowed to flow therethrough. On the contrary, when the processor 10 outputs a signal having high level voltage to the BJT Q1, the drain and the source of the MOSFET Q2 are disconnected, and the power provided by the power source 100 is cut off as a result.

The control circuit 30 is electrically connected to the pin Pin2 of the processor 10, the power switching circuit 20, and positive terminals M1+, M2+ of the first driver M1 and the second driver M2 to receive the power provided by the power source 100 which flows through the power switching circuit 20. The processor 10 controls the control circuit 30 to output power having either a first voltage or a second voltage to make the first driver M1 and the second driver M2 in either a magnetic excitation status or a magnetic coercive status, wherein the first voltage is greater than the second voltage. In the preferred embodiment, the control circuit includes a BJT Q3, a MOSFET Q4, and a Zener diode ZD1. The base of the BJT Q3 is electrically connected to the pin Pin2 of the processor 10. The gate of the MOSFET Q4 is electrically connected to the collector of the BJT Q3, the drain thereof is electrically connected to the source of the BJT Q2 of the power switching circuit 20, and the source thereof is electrically connected to the drivers M1, M2. The anode and the cathode of the Zener diode ZD1 are respectively electrically connected to the emitter of the BJT Q3 and the gate of the MOSFET Q4.

Whereby, when the pin Pin2 of the processor 10 outputs a signal having high level voltage to the BJT Q3, the drain and the source of the MOSFET Q4 are connected to allow the power provided by the power source 100 to flow therethrough, which makes the control circuit 30 output the power having the first voltage to the first driver M1 and the second driver M2, wherein the first voltage approaches the voltage of the power provided by the power source 100. As a result, the drivers M1, M2 are in the magnetic excitation status. On the contrary, when the pin Pin2 of the processor 10 outputs a signal having low level voltage to the BJT Q3, the drain and the source of the MOSFET Q4 are disconnected to cut off the power provided by the power source 100. At this time, the power of the power source is provided to the Zener diode ZD1 to break down the Zener diode ZD1, which makes the control circuit 30 output the power having the second voltage to the first driver M1 and the second driver M2, wherein the second voltage approaches the reverse breakdown voltage of the Zener diode ZD1. With the outputted low voltage, the drivers M1, M2 are in the magnetic coercive status.

The protection circuit 40 is electrically connected to the processor 10 and the control circuit 30. The processor 10 controls the protection circuit 40 to transmit or cut off the power outputted from the control circuit 30. In the preferred embodiment, the protection circuit 40 includes a BJT Q5 and a diode D. The base of the BJT Q5 is electrically connected to the pin Pin3 of the processor 10. The anode of the diode D is electrically connected to the gate of the MOSFET Q4, and the cathode thereof is electrically connected to the collector of the BJT Q5.

Whereby, when the pin Pin3 of the processor 10 outputs a signal having high level voltage to the BJT Q5, the BJT Q5 is switched on to switch on the diode D, and to cut off the MOSFET Q4, which cuts off the power outputted from the control circuit 30. Furthermore, the first driver M1 and the second driver M2 are also stopped at the same time. On the contrary, when the pin Pin3 of the processor 10 outputs a signal having low level voltage to the BJT Q5, the BJT Q5 and the diode D are both cut off, and therefore the control circuit 30 can work normally.

The first valve switching circuit 50 is electrically connected to the processor 10 and the first driver M1. The processor 10 controls the first valve switching circuit 50 to turn on or off the first driver M2, which opens or closes the main valve. In the preferred embodiment, the first valve switching circuit 50 includes a MOSFET Q6, of which the gate is connected to the pin Pin4 of the processor 10, and the drain is connected to a negative terminal M1− of the first driver M1.

Whereby, when the pin Pin4 of the processor 10 outputs a signal having high level voltage to the MOSFET Q6, the MOSFET Q6 is switched on to allow the first driver M1 to work normally. On the contrary, when the pin Pin4 of the processor 10 outputs a signal having low level voltage to the MOSFET Q6, the MOSFET Q6 is cut off, and the first driver M1 is turned off as a result.

The second valve switching circuit 60 is electrically connected to the processor 10 and the second driver M2. The processor 10 controls the second valve switching circuit 60 to turn on or off the second driver M2, which opens or closes the safety valve. In the preferred embodiment, the second valve switching circuit 60 includes a MOSFET Q7, of which the gate is connected to the pin Pin5 of the processor, and the drain is connected to a negative terminal M2− of the second driver M2.

Whereby, when the pin Pin5 of the processor 10 outputs a signal having high level voltage to the MOSFET Q7, the MOSFET Q7 is switched on to allow the second driver M2 to work normally. On the contrary, when the pin Pin5 of the processor 10 outputs a signal having low level voltage to the MOSFET Q7, the MOSFET Q7 is cut off, and the second driver M2 is turned off as a result.

The abnormal voltage detection circuit 70 is electrically connected to the processor 10, the control circuit 30, the first driver M1, and the second driver M2 to detect if the voltage provided to the first driver M1 from the control circuit 30 is higher than a first abnormal voltage, and to detect if the voltage provided to the second driver M2 is higher than a second abnormal voltage. If the voltage provided to the first driver M1 from the control circuit 30 is higher than the first abnormal voltage, the abnormal voltage detection circuit 70 outputs a first abnormal signal to the processor 10; if the voltage provided to the second driver M2 is higher than the second abnormal voltage, the abnormal voltage detection circuit 70 outputs a second abnormal signal to the processor 10. In the preferred embodiment, the abnormal voltage detection circuit 70 includes two Zener diodes ZD2, ZD3, wherein the breakdown voltages of the Zener diodes ZD2, ZD3 are taken as references of determining abnormal voltage. The Zener diode ZD2 has a first reverse breakdown voltage (as the first abnormal voltage), wherein the anode thereof is electrically connected to the pin Pin6 of processor 10, and the cathode thereof is electrically connected to the source of the MOSFET Q4 of the control circuit 30 and the first driver M1. The Zener diode ZD3 has a second reverse breakdown voltage (as the second abnormal voltage), wherein the anode thereof is electrically connected to the pin Pin7 of the processor 10, and the cathode thereof is electrically connected to the source of the MOSFET Q4 of the control circuit 30 and the second driver M2.

Whereby, when the voltage of the power outputted from the control circuit 30 is higher than the first reverse breakdown voltage or the second reverse breakdown voltage, the corresponding Zener diode ZD2, ZD3 is breakdown, which makes the abnormal voltage detection circuit 70 correspondingly generate the first abnormal signal or the second abnormal signal to the pin Pin6 or the pin Pin7 of the processor 10.

At this time, when the processor 10 receives the abnormal signals generated by the abnormal voltage detection circuit 70, the processor 10 correspondingly outputs signals according to the source of the received abnormal signals to control the follow up actions of the power switching circuit 20, the control circuit 30, the protection circuit 40, the first valve switching circuit 50, and the second valve switching circuit 60. In this way, the first driver M1 and the second driver M2 can be still turned off even if one of the circuits malfunctions, since the rest of the circuits are capable of doing the same job. In other words, with the aforementioned design, the circuit structure provided in the present invention can provide multi-protection, which further ensures the safety of using gas appliances. In addition, it is obvious to see that the circuit structure provided in the present invention has a simple structure, which not only greatly reduces the cost of manufacturing, but also simplifies the process of testing or maintenance.

It must be pointed out that the embodiments described above are only some preferred embodiments of the present invention. All equivalent structures which employ the concepts disclosed in this specification and the appended claims should fall within the scope of the present invention.

What is claimed is:

1. A circuit structure of a gas valve, wherein the circuit structure is connected to a power source, and controls a first driver and a second driver which respectively drive a main valve and a safety valve; comprising:
 a power switching circuit connected to the power source, wherein the power switching circuit transmits or cuts off power provided by the power source to flow therethrough;
 a control circuit electrically connected to the power switching circuit, the first driver, and the second driver, wherein the control circuit receives the power provided by the power source, and outputs power having either a first voltage or a second voltage to control the first driver and the second driver, wherein the first voltage is not equal to the second voltage;
 a protection circuit electrically connected to the control circuit to transmit or cut off the power outputted from the control circuit;
 an abnormal voltage detection circuit electrically connected to the control circuit, the first driver, and the second driver to detect if the voltage provided to the first driver from the control circuit is higher than a first abnormal voltage, and to detect if the voltage provided to the second driver is higher than a second abnormal voltage, wherein when the voltage provided to the first driver is higher than the first abnormal voltage, the abnormal voltage detection circuit outputs a first abnormal signal; when the voltage provided to the second driver is higher than the second abnormal voltage, the abnormal voltage detection circuit outputs a second abnormal signal;
 a first valve switching circuit connected to the first driver to turn on or off the first driver;
 a second valve switching circuit connected to the second driver to turn on or off the second driver; and
 a processor electrically connected to the power switching circuit, the control circuit, the protection circuit, the abnormal voltage detection circuit, the first valve switching circuit, and the second valve switching circuit, wherein the processor receives the first and the second abnormal signals outputted by the abnormal voltage detection circuit, and correspondingly outputs signals to control the power switching circuit, the control circuit, the protection circuit, the first valve switching circuit, and the second valve switching circuit.

2. The circuit structure of claim 1, wherein the power switching circuit has a BJT and a MOSFET, wherein the base of the BJT is electrically connected to the processor; the gate of the MOSFET is electrically connected to the collector of the BJT, the drain thereof is electrically connected to the power source, and the source thereof is electrically connected to the control circuit; when the processor outputs a signal having low level voltage to the BJT, the MOSFET transmits the power provided by the power source; when the processor outputs a signal having high level voltage to the BJT, the MOSFET cuts off the power provided by the power source.

3. The circuit structure of claim 1, wherein the first voltage is higher than the second voltage, and when the control circuit outputs the power having the first voltage to the first driver and the second driver, the first driver and the second driver are in a magnetic excitation status; when the control circuit outputs the power having the second voltage to the first driver and the second driver, the first driver and the second driver are in a magnetic coercive status.

4. The circuit structure of claim 1, wherein the control circuit has a BJT, a MOSFET, and a Zener diode, wherein the base of the BJT is electrically connected to the processor; the gate of the MOSFET is electrically connected to the collector of the BJT, the drain thereof is electrically connected to the power switching circuit, and the source thereof is electrically connected to the drivers; the anode and the cathode of the Zener diode are respectively electrically connected to the emitter of the BJT and the gate of the MOSFET; when the processor outputs a signal having high level voltage to the BJT, the MOSFET transmits the power provided by the power source to make the control circuit output the power having the first voltage to the first driver and the second driver, wherein the first voltage approaches the voltage of the power provided by the power source; when the processor outputs a signal having low level voltage to the BJT, the MOSFET cuts off the power provided by the power source to make the control circuit output the power having the second voltage to the first driver and the second driver, wherein the second voltage approaches the reverse breakdown voltage of the Zener diode.

5. The circuit structure of claim 4, wherein the protection circuit comprises a BJT and a diode, wherein the base of the BJT of the protection circuit is electrically connected to the processor; the anode of the diode of the protection circuit is electrically connected to the gate of the MOSFET, and the cathode thereof is electrically connected to the collector of the BJT of the protection circuit; when the processor outputs a signal having high level voltage to the BJT of the protection circuit, the BJT of the protection circuit is switched on to switch on the diode, and to cut off the MOSFET, and therefore the power outputted from the control circuit is cut off.

6. The circuit structure of claim 1, the abnormal voltage detection circuit comprises two Zener diodes, wherein the anode of one of the Zener diodes is electrically connected to the processor, and the cathode of the same Zener diode is electrically connected to the control circuit and the first driver; the anode of the other Zener diode is electrically connected to the processor, and the cathode of the other Zener diode is electrically connected to the control circuit and the second driver; when the voltage of the power outputted from the control circuit is higher than the reverse breakdown voltage of the Zener diode, the Zener diode is switched on to make the abnormal voltage detection circuit correspondingly generate the first abnormal signal or the second abnormal signal to the processor.

7. The circuit structure of claim 1, wherein the first valve switching circuit comprises a MOSFET, of which the gate is connected to the processor, and the drain thereof is connected to the first driver; when the processor outputs a signal having high level voltage to the MOSFET, the MOSFET is switched on to allow the first driver to work; when the processor outputs a signal having low level voltage to the MOSFET, the MOSFET is cut off to turn off the first driver.

8. The circuit structure of claim 1, wherein the second valve switching circuit comprise a MOSFET, of which the gate is connected to the processor, and the drain thereof is connected to the second driver; when the processor outputs a signal having high level voltage to the MOSFET, the MOSFET is switched on to allow the second driver to work; the processor when the processor outputs a signal having low level voltage to the MOSFET, the MOSFET is cut off to turn off the second driver.

9. The circuit structure of claim 1, wherein the first driver and the second driver are both solenoid valves.

10. The circuit structure of claim 1, wherein the first driver and the second driver are both stepping motors.

* * * * *